Patented Nov. 28, 1944

2,364,034

UNITED STATES PATENT OFFICE 2,364,034

RUBBERLIKE INTERPOLYMERS AND PREPARATION OF SAME

Oskar Huppert, Newark, N. J.

No Drawing. Application January 21, 1943,
Serial No. 473,141

6 Claims. (Cl. 260—7)

This invention relates to the preparation and uses of artificial rubber, latex, adhesives, synthetic resins and plastics, lacquer emulsions, varnishes, laminated products and plastic fibers.

This invention has as an object the preparation of polymers from pseudo-thiohydantoin-protein, phenolic substances and aldehydes.

In carrying out the process the protein preferably employed is of the prolamine type, but vegetable proteins such as soya bean protein can also be subjected to the polymerization as described hereafter.

In my copending applications Serial No. 401,977, filed July 11, 1941, Serial No. 431,082, filed Feb. 16, 1942, now Patent Nos. 2,343,011 and 2,343,012, there are disclosed methods for the preparation of pseudo-thiohydantoin-proteins. The method is briefly, heating a mixture of a lower aliphatic alpha thiocyano acid and a protein in an organic solvent. As phenolic substances I use phenol, cresols, xylenols and other phenolic bodies. The well known property of phenolic substances, practically of phenol and cresylic acid, to dissolve the lower aliphatic alpha halogenated acids and ammonium-thiocyanate as well as proteins such as zein and soya bean protein is utilized in the present invention to employ the phenolic material as a distributing vehicle for the thereby formed pseudo-thiohydantoin-proteins.

As aldehydes I prefer to use formaldehyde, but others such as acetaldehyde, glyoxal, paraformaldehyde, hexamethylentetramine, furfural may also be used.

This invention has for its primary object to provide an artificial rubber, which is compounded by polymerization of a protein derivative, a phenolic substance and an aldehyde.

Another object of the invention is the production of a thermoplastic material to be used either as a bonding agent by molding, casting or extrusion for comminuted fillers, ultimate deplasticization being secured by continued thermal polymerization or for laminated fabrics by impregnating sheets of cloth or paper.

Other objects of the invention being adhesives, lacquer emulsions, spirit varnishes, distempers, textile auxiliaries.

Still another object is the use of the new polymer as a raw material for artificial wool from zein.

The polymeric derivatives of proteins, described in this invention are formed by polymerization of pseudo-thiohydantoin-zein and hydroxy-benzyl alcohols, using for example as protein the prolamine "zein or fish protamine" as phenolic substance "phenol" and "formaldehyde" as aldehyde.

Pseudo-thiohydantoin zein is obtained by the reaction of zein with a solution of thiocyano acetic acid (NCS—CH$_2$—COOH) in phenol, by dissolving ammonium thiocyanate and monochloroacetic acid and zein in phenol and heating the mixture in a boiling water bath, whereby as an intermediate the zein-amid of the carbamylthioglycol acid (NH$_2$—CO—S—CH$_2$—CONH—zein') is produced, zein' denoting here the radical of zein which may be represented as zein'—NH$_2$.

The reaction takes place as follows:

(1) NH$_4$CNS+ClCH$_2$COOH=
    NCS—CH$_2$—COOH+NH$_4$Cl (2) NCS—CH$_2$—COOH+zein+H$_2$O=
    NH$_2$—CO—S—CH$_2$—CONH—zein'+H$_2$O (3) 

Taking a phenol-formaldehyde mixture as an example, hydroxybenzyl alcohols are first formed, substitution occurring only at positions ortho and para to the hydroxyl group.

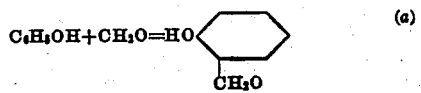      (a)

      (a')

Pseudothiohydantoin-zein reacts with formaldehyde to form 5 oxymethyl-pseudo-thiohydantoin-3-zein as follows:

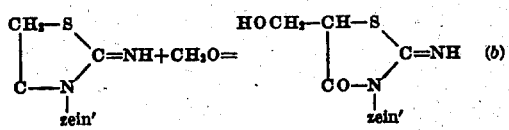      (b)

The simplest reaction which can occur is that between one molecule a and b to form the copolymer c as follows:

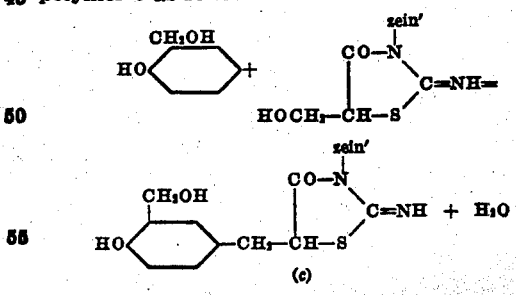

(c)

or between one molecule $a'$ and $b$ to form the copolymer $c'$ as follows:

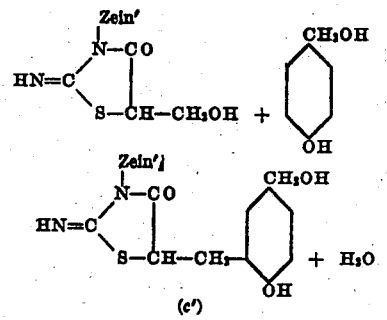

The copolymers $c$ and $c^1$ containing an ortho or para oxybenzylalcohol residue linked through a methylene group with a pseudo-thiohydantoin protein residue, still contain in the 5-position on the thiohydantoin ring an active hydrogen atom and a corresponding residual oxymethyl group in the benzene ring. It is, therefore capable of reaction on these bifunctional groups (OH,H) or with itself. In one of the two cases water elimination would produce a chain compound of increased molecular weight, always possessing these two reactive groups, making it capable of still further increase in chain length and molecular weight. The fundamental unit ($C_1$) in the chain is ($C_1$) according to the equation $c+c'=C_1+H_2O$.

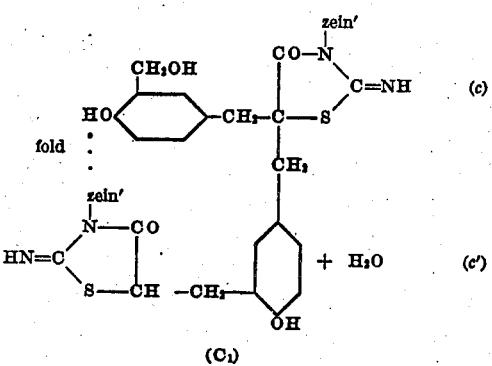

This unit may be repeated an indefinite number of times $$C_1+c=C_2+H_2O$$

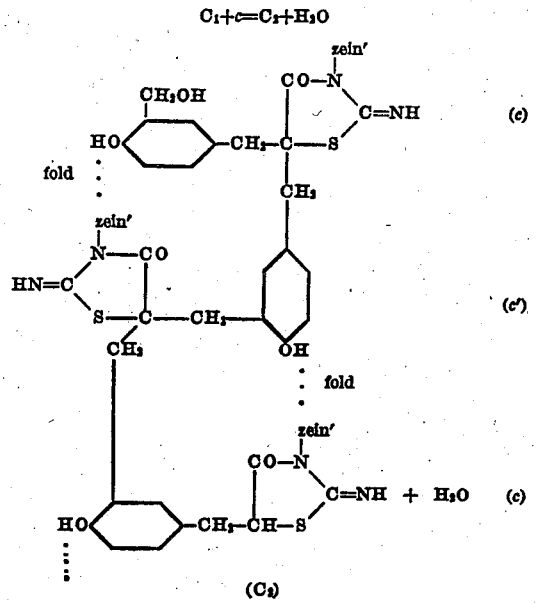

The chains are assumed to be folded due to attraction between the hydroxyl group in the benzene ring and the protein residue in the pseudothiohydantoin ring. On stretching, the fold can be opened up like in wool and the chains are capable of elongation and more or less parallel alignment to each other. (Thermoplastic type.)

As examples of various compositions, ranges of proportions, and what are now believed to be preferred proportions, the following are given: but it is to be understood that the invention is not limited to these specific examples.

The proportions of protein, phenolic substances and aldehydes may be varied over a wide range. The effective upper limit for protein is 70% of the weight of the phenolic material, the lower practical limit for protein is 30%. The amount of aldehydes may be expressed on the basis of formaldehyde 100% (to be used as 40% aqueous solution) and equals 50 to 80% of the weight of the phenolic substance.

The ingredients are placed in a closed, steam-jacketed kettle and heated for several (1 to 5) hours, the process to be performed in two steps, the aldehydes to be added in the second step and the mixture to be heated to 100° C. To transform the proteins in pseudothiohydantoin-proteins I use in the first step for 1000 parts of protein 25 parts of monochloracetic acid and 19 parts of ammonium sulfocyanide. Water is finally eliminated by heating under vacuum and the molten material removed from the kettle.

The thermoplastic type is made with alkaline catalysts, which by the alkaline reaction of the pseudothiohydantoin proteins may be omitted. The preferred ratio of phenol, formaldehyde, protein is 100:65:60 (Example 1).

For quick curing molding compositions, containing subsequently incorporated hexamethylentetramine in the molding powder, prepared by grinding together on hot rolls the thermosetting type with fillers and pigments or dyes. The preferred ratio of phenol, formaldehyde, protein is then 100:75:45 (Example 2).

The lower polymers are very viscous fluids at elevated temperature and are soluble in alcohol, surprisingly too that prepared from soya bean protein, adheres to paper, felt, wood, leather, etc., forming between two solid surfaces a thin film of amorphous material of high internal cohesion and high adhesion to the surfaces, producing a bond of great strength.

The higher polymers of the thermoplastic series dissolve relatively slowly and solution itself is preceded by swelling of the solid. These members represent an elastic body, which possesses many of the physical characteristics of rubber. This artificial rubber is sufficiently washed between kneading rolls for removal of remaining water soluble ingredients and is then milled. Fillers and softeners may be then introduced and the material molded and cured by heat. By extruding the molten higher polymerized thermoplastic material through a fine orifice, modified protein fibers can be produced by stretching and they become then relatively transparent and mechanically much stronger.

Dissolved in a solvent mixture such as alcohol with ethyleneglycol monoethylether or sec. butylalcohol or ethyl lactate with additional plasticizers such as dibutyltartrate, toluene-sulphonyl-ethylamide, monoethanolamine acetate, they may be used for complete replacement of shellac solutions and for lacquer emulsions, thinned to suitable workability by dispersion in water.

In a solution in alcohol and some sulfonated castor oil or other emulsifying agents they form as water insoluble plastics a milky rubberlike latex, which may be used as a latex substitute, as a textile auxiliary for finishing and aftertreatment of plastic and textile fibers. Further, their solutions in alcohol and levelling solvents with additional plasticizers such as glyceryl phenylether, diethyl-diphenyl-urea can be applied in coating for metals where electrical resistance is required. Mixed with pigments these spirit varnishes are very useful in finishing of leather and artificial cloth. By impregnating sheets of cloth or paper laminated materials of impact strength and wear resistance can be fabricated. Further, for special purposes they may be modified with alkyd resins, rosin or rosin esters.

The physical properties of the higher polymers of the thermoplastic series may be further improved by milling small quantities of sulfur and such organic materials as thiuramdisulfid, dialkylthiuramdisulfid into the masticated rubberlike polymer.

The incorporation of suitable solids such as carbon black, zinc oxide, magnesium carbonate as reinforcing agents or fillers and internal lubricants such as stearic acid increases not only the stiffness but also the tensile strength and resistance to abrasive wear of the artificial protein rubber. Both roll mills and mixers may be used and after homogeneity is attained the rubberlike polymer is ready to be shaped before heating for vulcanization. Sheets of uniform thickness may be first produced by calendering.

The vulcanization may be carried out in molds in a hydraulic press by heating either electrically or by steam, but hot water vulcanization is also recommended.

The polymers obtained from soya protein may be used as the vehicle for water paints, distempers, which by grinding with pigments and emulsifying agents disperse readily in water and when applied to a surface produce a matte finish which becomes quite insoluble and adheres firmly to the underlying material.

Using higher proportions of phenolic substances and aldehydes three-dimensional plastics can be obtained, whereby initial polymerization is carried as far as practicable, but final cross-linkage is secured by heat after shaping, conveniently as powders with fillers and pigments, giving a product no longer softened by heat owing to the stiffness of a chain structure, cross-linked by oxybenzyl bridges and to the irreversibility of the chemical changes which occur in ultimate set.

The above description and examples are intended to be illustrative only. Any modifications of or variation therefrom which conform to the spirit of the invention is intended to be included within the scope of the claims.

What is claimed is:

1. The process of manufacturing rubber-like thermoplastic products of high molecular weight which comprises reacting a protein, monochloracetic acid and ammonium-sulfocyanide and a phenol at 100° C., adding then an aldehyde and heating the mixture at 100° C.

2. The process of manufacturing rubber-like thermoplastic products of high molecular weight which comprises reacting a protein, monochloracetic acid and ammonium-sulfocyanide and a phenol at 100° C., adding then formaldehyde and heating the mixture at 100° C.

3. The process of manufacturing rubber-like thermoplastic products of high molecular weight which comprises reacting zein, monochloracetic acid and ammonium-sulfocyanide and cresylic acid at 100° C., adding then formaldehyde and heating the mixture at 100° C.

4. The product obtained by the process of claim 1.

5. The product obtained by the process of claim 2.

6. The product obtained by the process of claim 3.

OSKAR HUPPERT.